US012714971B2

(12) United States Patent
Dunn et al.

(10) Patent No.: US 12,714,971 B2
(45) Date of Patent: Aug. 25, 2026

(54) METHANE MITIGATION SYSTEM WITH USE OF WASTE HEAT FOR POWER GENERATION

(71) Applicant: Enhanced Energy Group LLC., West Kingston, RI (US)

(72) Inventors: Paul M. Dunn, West Kingston, RI (US); Barry Drake Lawson, Houston, TX (US); Behnam Fakhari Kisomi, Houston, TX (US); Garett Paul Lambert, Houston, TX (US); Ian Glen Buchanan, Calgary (CA); Darius Remesat, Calgary (CA)

(73) Assignee: Enhanced Energy Group LLC, West Kingston, RI (US)

( * ) Notice: Subject to any disclaimer, the term of this patent is extended or adjusted under 35 U.S.C. 154(b) by 452 days.

(21) Appl. No.: 18/506,543

(22) Filed: Nov. 10, 2023

(65) Prior Publication Data

US 2025/0153102 A1 May 15, 2025

(51) Int. Cl.
*B01D 53/94* (2006.01)
*B01D 53/04* (2006.01)
(Continued)

(52) U.S. Cl.
CPC ......... *B01D 53/94* (2013.01); *B01D 53/0462* (2013.01); *B01D 53/343* (2013.01);
(Continued)

(58) Field of Classification Search
CPC .. B01D 53/94; B01D 53/0462; B01D 53/343; B01D 2253/116; B01D 2255/1021; B01D 2255/1023; B01D 2257/504; B01D 2257/7025; B01D 2258/012; B01D 53/864; F01N 3/2033; F01N 3/2803; F01N 5/02
See application file for complete search history.

(56) References Cited

U.S. PATENT DOCUMENTS 9,404,685 B2 8/2016 Xuan et al.
10,240,119 B2 * 3/2019 Bradin .................. C12M 43/00
(Continued)

FOREIGN PATENT DOCUMENTS

CN 102797544 A 11/2012
CN 101379279 B 11/2013
(Continued)

*Primary Examiner* — Andrew J. Oyer

(57) ABSTRACT

A methane mitigation system includes an exhaust source, a burner, an oxidation catalyst, and an electrical power generator. The exhaust source is configured to produce an exhaust gas including methane. The burner is configured to receive the exhaust gas, and use a natural gas for combustion to produce a heat of combustion that heats the exhaust gas to produce a hot exhaust gas. The oxidation catalyst is configured to receive the hot exhaust gas and convert at least a portion of the methane in the hot exhaust gas to carbon dioxide. The oxidation catalyst is configured to be heated by the hot exhaust gas, and is configured to output a methane-depleted exhaust gas. The electrical power generator is configured to receive the methane-depleted exhaust gas, convert a portion of a remaining heat from the methane-depleted exhaust gas into electrical power, and output the electrical power to an electrical load.

20 Claims, 4 Drawing Sheets

(51) Int. Cl.

| | |
|---|---|
| ***B01D 53/34*** | (2006.01) |
| ***F01N 3/20*** | (2006.01) |
| ***F01N 3/28*** | (2006.01) |
| ***F01N 5/02*** | (2006.01) |

(52) U.S. Cl.

CPC ......... *F01N 3/2033* (2013.01); *F01N 3/2803* (2013.01); *F01N 5/02* (2013.01); *B01D 2253/116* (2013.01); *B01D 2255/1021* (2013.01); *B01D 2255/1023* (2013.01); *B01D 2257/504* (2013.01); *B01D 2257/7025* (2013.01); *B01D 2258/012* (2013.01)

(56) References Cited

U.S. PATENT DOCUMENTS

| | | | | |
|---|---|---|---|---|
| 11,571,652 | B2 | 2/2023 | Shah et al. | |
| 2016/0310895 | A1* | 10/2016 | Tissler | B01D 53/8668 |
| 2017/0040629 | A1* | 2/2017 | Farooque | H01M 8/04089 |
| 2021/0024438 | A1* | 1/2021 | Radaelli | C07C 4/04 |
| 2022/0355244 | A1 | 11/2022 | Van Dam et al. | |

FOREIGN PATENT DOCUMENTS

| | | | |
|---|---|---|---|
| CN | 109609223 | A | 4/2019 |
| EP | 2164600 | B1 | 10/2016 |
| EP | 3344368 | B1 | 9/2021 |

* cited by examiner

200

METHANE MITIGATION SYSTEM WITH USE OF WASTE HEAT FOR POWER GENERATION

TECHNICAL FIELD

The present disclosure relates generally to methane abatement with an electrical power generation system.

BACKGROUND

Engine exhaust emissions of methane ($CH_4$) and carbon dioxide ($CO_2$) have a substantial role in contributing to greenhouse gases in the atmosphere and to climate change. Methane is a potent greenhouse gas with a higher global warming potential than $CO_2$ over a 20-year period. Therefore, effective methods for capturing $CO_2$ and reducing $CH_4$ in engine exhaust are needed. One method for separating and removing carbon dioxide from gas streams uses molecular sieves in conjunction with a temperature swing adsorption (TSA) technique. Due to high porosity and a clearly defined pore structure, molecular sieves allow for a selective adsorption of $CO_2$ molecules according to molecular size and shape. Typically, zeolites, which are crystalline aluminosilicates with homogeneous and clearly defined pore structures, are utilized as molecular sieves for $CO_2$ capture. Alternatively, solvent-based carbon capture may be used in which a solvent, such as an amine solvent, is used to remove $CO_2$ from a gas stream. While these carbon capture systems help to reduce $CO_2$ emissions, methane $CH_4$ mitigation is also needed. For example, since some $CH_4$ may escape during engine combustion and since carbon capture media (e.g., molecular (mole) sieves or one or more solvents) are not selective to capture (e.g., adsorb or absorb) $CH_4$, methane gas is likely to remain in the gas stream and eventually travel up an emissions stack, thereby causing emission problems. Thus, it may be necessary to reduce or eliminate $CH_4$ from the gas stream before the $CH_4$ reaches the carbon capture system. Furthermore, an amount of $CO_2$ captured in carbon capture systems could be improved to further reduce greenhouse gases.

In addition, a viability and economics of greenhouse gas mitigation technologies are significantly impacted by energy consumption of a $CH_4$ mitigation process and/or a $CO_2$ capture process. In other words, an amount of energy required to effectively reduce and/or capture $CH_4$ and/or $CO_2$ from gas streams should be minimized. Thus, more effective methods for capturing $CO_2$ and $CH_4$ from engine exhaust with reduced energy consumption is needed.

The methane mitigation system of the present disclosure solves one or more of the problems set forth above and/or other problems in the field.

SUMMARY

In some implementations, a methane mitigation system includes an exhaust source configured to produce an exhaust gas including methane; a burner arranged downstream from the exhaust source and configured to receive the exhaust gas and a natural gas, wherein the burner is configured to use the natural gas for combustion to produce a heat of combustion that is configured to heat the exhaust gas to produce a hot exhaust gas; an oxidation catalyst arranged downstream from the burner and configured to receive the hot exhaust gas and convert at least a portion of the methane in the hot exhaust gas to $CO_2$, wherein the oxidation catalyst is configured to be heated by the hot exhaust gas, and wherein the oxidation catalyst is configured to output a methane-depleted exhaust gas; and an electrical power generator arranged downstream from the oxidation catalyst and configured to receive the methane-depleted exhaust gas, wherein the electrical power generator is configured to convert a portion of a remaining heat from the methane-depleted exhaust gas into electrical power, and wherein the electrical power generator is configured to output the electrical power to an electrical load.

In some implementations, a method of mitigating methane includes producing, by an exhaust source, an exhaust gas containing methane; performing, by a burner arranged downstream from the exhaust source, a combustion with a natural gas and oxygen to generate heat that heats the exhaust gas to produce a hot exhaust gas that is hotter than the exhaust gas; heating an oxidation catalyst, arranged downstream from the burner, with the hot exhaust gas; converting, by the oxidation catalyst, at least a portion of the methane in the hot exhaust gas to $CO_2$ to produce a methane-depleted exhaust gas, wherein heating the oxidation catalyst increases an amount of methane converted by the oxidation catalyst into the $CO_2$; providing heat to an electrical power generator, arranged downstream from the oxidation catalyst, with the methane-depleted exhaust gas; generating, by the electrical power generator, electric power using heat from the methane-depleted exhaust gas, wherein heating the electrical power generator with the methane-depleted exhaust gas increases a temperature of the electrical power generator to a target temperature range in order to increase a power generation efficiency of the electrical power generator; and outputting, by the electrical power generator, the electric power to an electrical load.

DETAILED DESCRIPTION

Figure 1:
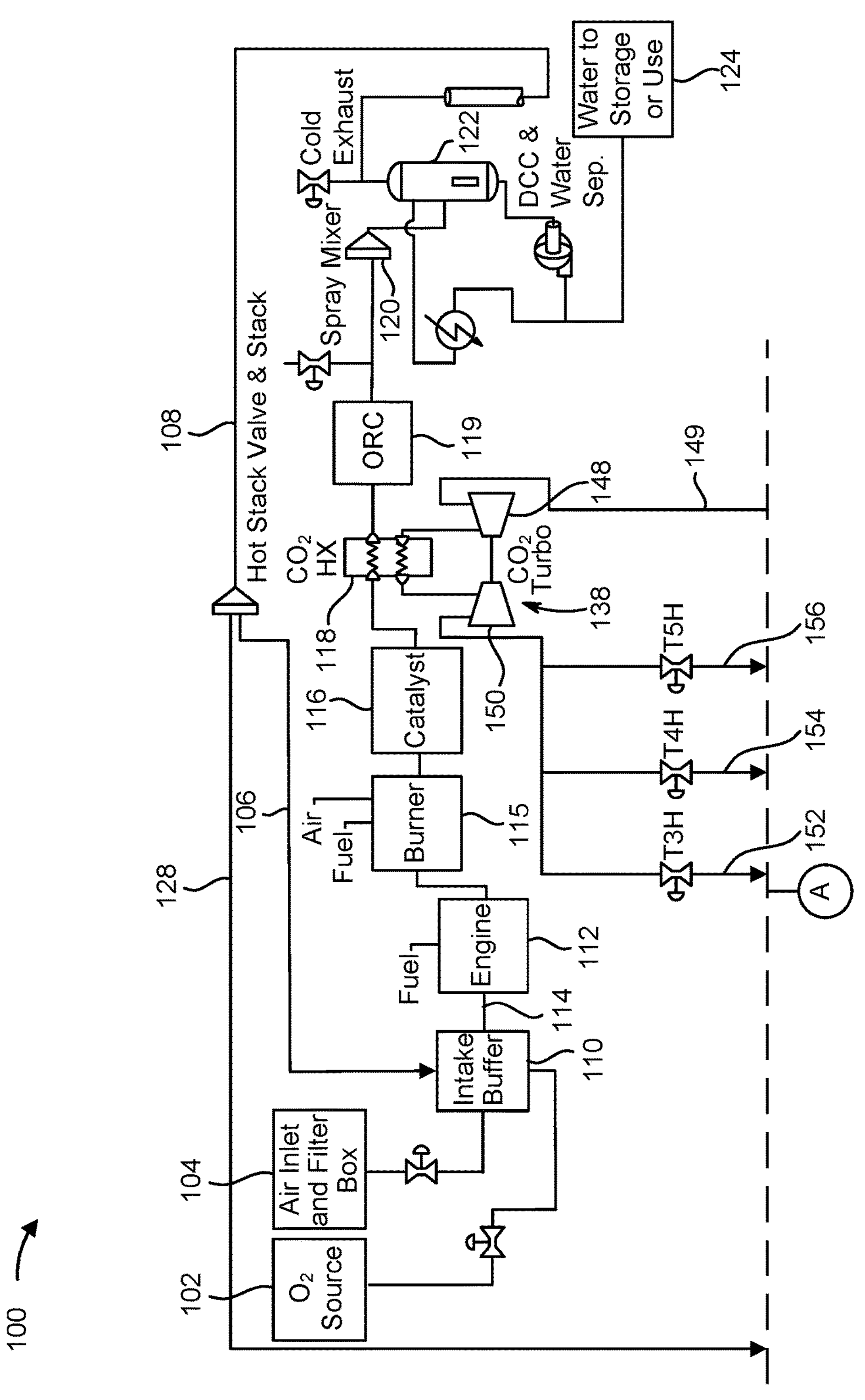
FIG. 1 illustrates a greenhouse gas abatement system according to one or more implementations.
Figure 1:
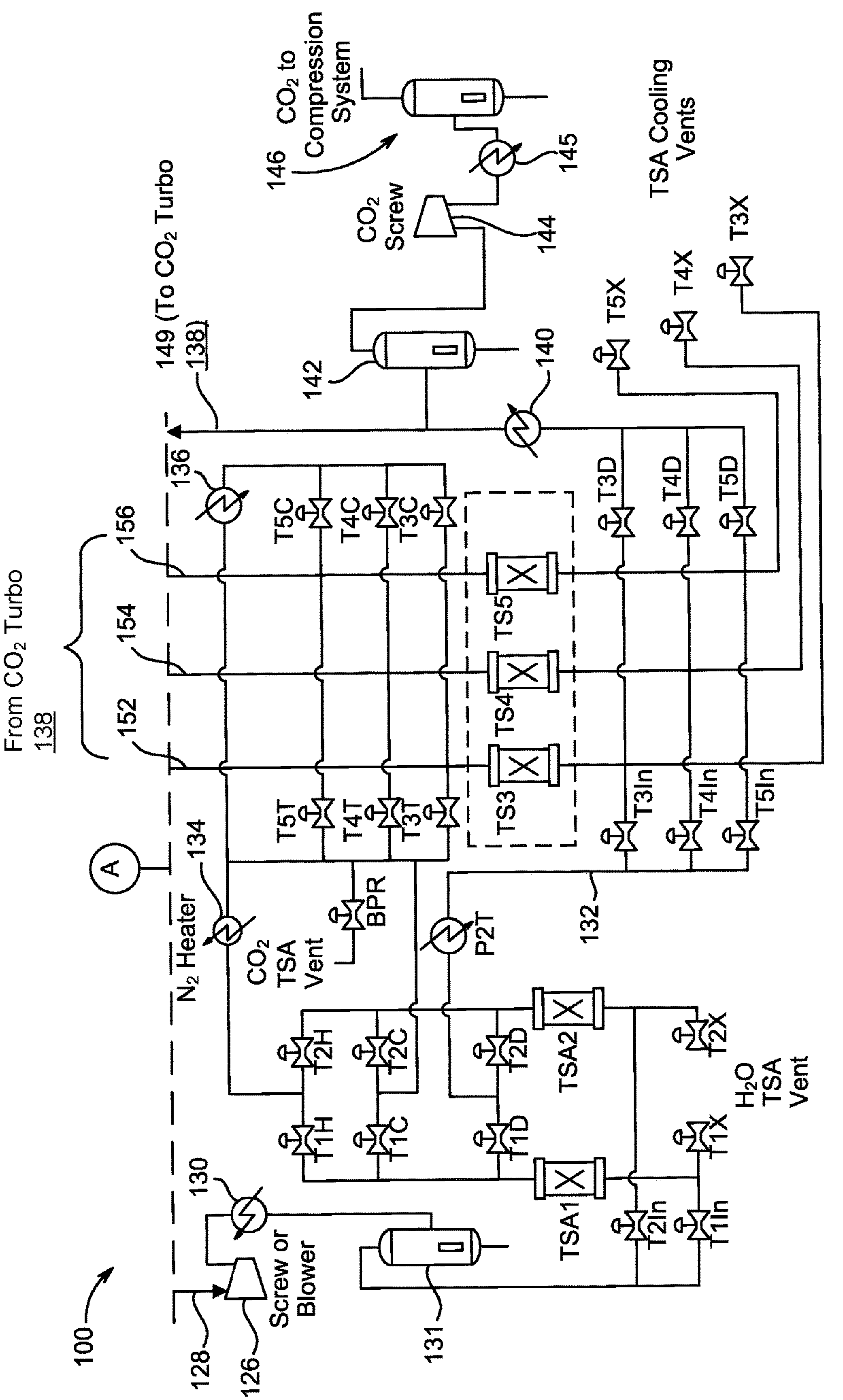

This disclosure relates to a methane mitigation system which is applicable to any machine, system, or plant that uses a combustion engine, such as a piston engine or a turbine engine, as an exhaust source to produce an exhaust. For example, the methane mitigation system may provide an enhanced $CH_4$ capture performance with a net-zero or a net-positive electrical power consumption. In other words, the methane mitigation system may generate at least as much electrical power that is consumed by a methane mitigation process and/or by other electrical loads, such as a carbon capture system. In some implementations, the combustion engine is a lean burn engine.

The methane mitigation system may include a burner and a methane oxidation catalyst downstream from the combustion engine to increase an exhaust gas temperature and to reduce $CH_4$ from the exhaust. In addition, the methane mitigation system may include an electrical power generator, such as a waste heat to power generator, that utilizes heat of waste gases from the exhaust to generate electrical and/or mechanical power to drive auxiliary loads (e.g., fans, cooling systems, compression systems, etc.). For example, the methane mitigation system may be coupled to a carbon capture system, and the electrical power generated by the electrical power generator may be used to drive at least one fan, blower, or screw of the carbon capture system for moving at least one gas through the carbon capture system. Additionally, or alternatively, the electrical power generated by the electrical power generator may be used to drive a subsystem or one or more other components of the carbon capture system. As a result, a total energy consumption of a $CH_4$ mitigation process and/or a $CO_2$ capture process may be reduced. In some implementations, the waste heat to power generator may be a waste heat recovery unit (WHRU) or an Organic Rankine Cycle (ORC) power generator that is configured to use heat produced by the burner to generate the electrical power. For example, the heat produced by the burner may be used to drive an ORC of the ORC power generator. As a result, an energy cost related with $CO_2$ capture can be decreased by improvements in heat integration, process intensification, and the use of waste heat sources.

The methane mitigation system and methods may provide as least one of the following benefits, including: achieve optimal performance in terms of $CH_4$ abatement and $CO_2$ capture efficiency, lower a cost of carbon capture, and use waste heat to generate electrical power to reduce electrical loads.

A combination of the burner, the methane oxidation catalyst, and the electrical power generator of the methane mitigation system may provide at least one of the following additional benefits, including (1) the combination reduces or eliminates uncombusted methane from the engine exhaust, with use of the methane oxidation catalyst, (2) using the burning upstream from the methane oxidation catalyst provides a higher methane destruction than would otherwise be possible with the burner alone (e.g., without the methane oxidation catalyst) or with the methane oxidation catalyst alone (e.g., without the burner), (3) the heat generated by the burner may be used to heat the methane oxidation catalyst, which may increase a methane conversion efficiency of the methane oxidation catalyst, (4) the heat generated by the burner may be used to heat the methane oxidation catalyst, which may increase a tolerance of the methane oxidation catalyst to sulfur components present in the exhaust stream such that the methane oxidation catalyst does not need to be regenerated and a risk of sulfur poisoning is reduced or eliminated by going up to temperatures above 900° Fahrenheit (F), (5) the methane oxidation catalyst may convert the methane into carbon dioxide, which may be captured by a carbon capture system such that the carbon capture system captures methane-converted $CO_2$ to reduce both $CH_4$ and $CO_2$ emissions, (6) higher temperatures in the exhaust gas produced by the burner may enable higher power generation efficiency of the electrical power generator, which may be used by to reduce parasitic loads and other electrical loads of the carbon capture system and may eliminate a need for gas-fired power generation to power the carbon capture system, and (7) heat from the burner may be used in a regeneration process of the carbon capture system to drive out captured $CO_2$ from carbon capture media. Thus, the combination of the burner, the methane oxidation catalyst, and the electrical power generator may be used as a co-generation unit, by generating electrical power and useful heat. The heat may also be used for a regeneration loop ($CO_2$ release-desorption) of the carbon capture system. The heat may be useful for both the regeneration process of a TSA carbon capture system that uses molecular sieves or a solvent-based carbon capture system. For example, the heat may be used to reduce a time for regeneration and to improve a percentage of carbon captured due to increased regeneration.

FIG. 1 illustrates a greenhouse gas abatement system 100 according to one or more implementations. FIG. 1 is split into two portions that are conjoined along line A, with each of the two portions being on a different sheet. The greenhouse gas abatement system 100 includes components for a $CO_2$-TSA processes with a semi-closed cycle. The components may be interconnected by a plurality of manifolds that may be configured to carry one or more fluids (e.g., liquids, gases, or gas-liquid mixtures).

The greenhouse gas abatement system 100 may include an $O_2$ source 102 (e.g., an $O_2$ plant) that provides $O_2$, an air inlet and filter box 104 that provides air, an SCC path 106 that is used to provide a portion of cooled exhaust from an exhaust return path 108, an intake buffer tank 110, and an engine 112. As is the case with any combustion engine, fuel is combusted, and that combustion requires an oxidizer, which is generally air. The engine 112 (e.g., a turbine engine or a piston engine) may draw in a working fluid 114 from the intake buffer tank 110. In some implementations, the engine 112 may be another type of exhaust source. The working fluid 114 used as an artificial atmosphere may be a mixture of air, oxygen, and cooled exhaust. A mixed concentration of oxygen in the intake buffer tank is a variable, but generally falls in the range of 12-22% $O_2$. The engine 112 combusts the fuel in the artificial atmosphere to produce a hot exhaust (e.g., a hot flue gas).

A burner 115 may be arranged downstream from the engine 112 and may be configured to receive the hot exhaust gas and a fuel (e.g., a natural gas (NG)), and use the fuel for combustion to produce a heat of combustion that is configured to heat the hot exhaust gas to produce a hotter exhaust gas. Thus, the burner 115 may receive the natural gas from an external natural gas source that is separate from the exhaust source (e.g., a source that is separate from the engine 112). The burner 115 may be a duct burner or any other heat source that generates additional heat to increase a temperature of the hot exhaust gas to produce the hotter exhaust gas.

In some implementations, the hot exhaust gas from the engine 112 includes oxygen, and the burner 115 may use the oxygen for the combustion in the burner 115. As a result, the burner 115 may combust oxygen in the hot exhaust gas to reduce an amount of oxygen in a gas stream. Additionally, or alternatively, the burner 115 may be configured to receive oxygen from an external oxygen source (e.g., provided in air), and use the oxygen for the combustion. Thus, the oxygen from the hot exhaust gas and/or the external oxygen source may be consumed by the burner 115 to increase the temperature of the hot exhaust gas to produce the hotter exhaust gas. Using hot oxygen that is already present in the hot exhaust may provide a higher burner efficiency, since using oxygen from cold air to augment the oxygen supply at the burner 115 may lower an efficiency of the burner 115.

The heat of combustion produced by the burner 115 may increase the temperature of the hot exhaust gas to at least 900° F. In other words, a temperature of the hotter exhaust gas that flows out of the burner 115 may be at least 900° F. In some implementations, the temperature of the hotter exhaust gas may be between 900° F. and 1400° F. The hotter exhaust may flow through a methane oxidation catalyst 116 that is arranged downstream from the burner 115. The methane oxidation catalyst 116 may receive the hotter exhaust gas and convert at least a portion of the methane in the hotter exhaust gas to $CO_2$. Moreover, the methane oxidation catalyst 116 may be configured to be heated by the hotter exhaust gas using the heat of combustion produced by the burner 115, and the methane oxidation catalyst 116 may be configured to output a methane-depleted exhaust gas. In some implementations, the methane oxidation catalyst 116 may be made of at least one platinum-group metal, such as ruthenium, rhodium, palladium, osmium, iridium, and/or platinum. For example, the methane oxidation catalyst 116 may be a platinum-palladium catalyst.

By arranging the methane oxidation catalyst 116 downstream from the burner 115, the burner 115 may be configured to heat the methane oxidation catalyst 116 with the hotter exhaust gas to an operating temperature that is between 900° F. and 1400° F. A conversion efficiency of the methane oxidation catalyst 116 may be improved with increased temperature. Thus, the hotter exhaust gas may be used to increase a temperature of the methane oxidation catalyst 116 in order to increase an amount of methane converted by the methane oxidation catalyst 116 into $CO_2$. In other words, the hotter exhaust gas may be used increase the temperature of the methane oxidation catalyst 116 in order to increase a methane conversion efficiency of the methane oxidation catalyst 116. The burner 115 and the methane oxidation catalyst 116 may form at least part of a methane mitigation system that is capable of removing $CH_4$ from the gas stream prior to a carbon capture portion of the greenhouse gas abatement system 100. Furthermore, oxidation by the methane oxidation catalyst 116 may create additional heat that is added to the gas stream (e.g., to the methane-depleted exhaust gas).

In addition, the hotter exhaust gas may be used to increase the temperature of the methane oxidation catalyst 116 in order to increase a tolerance of the methane oxidation catalyst 116 to sulfur components present in the hotter exhaust gas. In other words, the hotter exhaust gas may be used to increase the temperature of the methane oxidation catalyst 116 in order to prevent the methane oxidation catalyst 116 from being deactivated by sulfur components present in the hotter exhaust gas.

The methane-depleted exhaust gas, which may have a temperature between 900° F. and 1400° F., may flow from the methane oxidation catalyst 116 to an exhaust heat exchanger 118 (e.g., $CO_2$ heat exchanger ($CO_2$ HX)). The exhaust heat exchanger 118 may use a portion of the heat from the methane-depleted exhaust gas for regenerative purposes within a carbon capture process (e.g., for a regeneration stage of the greenhouse gas abatement system 100). The regenerative purposes may apply to at least one of a molecular sieve or a solvent (e.g., a carbon capture solvent), depending on a type of carbon capture system that is used.

The methane-depleted exhaust gas may pass through the exhaust heat exchanger 118 to an electrical power generator 119 arranged downstream from the methane oxidation catalyst 116. The electrical power generator 119 may receive the methane-depleted exhaust gas and convert a portion of a remaining heat (e.g., a portion of a remaining waste heat) from the methane-depleted exhaust gas into electrical power. In addition, the electrical power generator 119 may output the electrical power to one or more electrical loads, such as one or more fans or other components of a carbon capture system that is arranged downstream from the electrical power generator 119. The electrical power generator 119 may be used to reduce an electrical load of the carbon capture system, thereby reducing an operating cost of the carbon capture system. In some implementations, the electrical power generator 119 may output the electrical power or part of the electrical power to one or more electrical loads outside of the carbon capture system.

The electrical power generator 119 may be an ORC power generator or another type of waste heat to power generator. While the exhaust heat exchanger 118 may partially cool the methane-depleted exhaust gas, a remaining waste heat in the methane-depleted exhaust gas is of high enough grade (e.g., is of high enough temperature) to provide a higher power generation efficiency to the electrical power generator 119 to generate the electrical power. For example, an ORC power generator has higher efficiencies based on a temperature gradient (e.g., a temperature difference) between a maximum operating temperature and a minimum operating temperature. Thus, a larger temperature gradient provides a higher power generation efficiency when compared to smaller temperature gradients. In other words, the methane-depleted exhaust gas may increase a maximum (operating) temperature of the electrical power generator 119 in order to increase a power generation efficiency of the electrical power generator 119. The heating of the electrical power generator 119 with the methane-depleted exhaust gas may increases a temperature of the electrical power generator to a target temperature range in order to increase a power generation efficiency of the electrical power generator 119. By arranging the burner 115 and the methane oxidation catalyst 116 upstream from the electrical power generator 119 to increase a resultant temperature of the methane-depleted exhaust gas, both an amount of power and an efficiency at which the power is generated by the electrical power generator 119 can be increased. The electrical power generator 119 may form part of the methane mitigation system. Thus, the methane mitigation system may be a net-zero-power or a net-positive-power electrical power system.

The methane mitigation system formed by the burner 115, the methane oxidation catalyst 116, the electrical power generator 119, and optionally the exhaust heat exchanger 118, may be coupled to a carbon capture system. The carbon capture system may include all remaining system components arranged downstream from the electrical power generator 119. Thus, the methane-depleted exhaust gas, still containing $CO_2$, may pass through the electrical power generator 119 to the carbon capture system arranged downstream from the electrical power generator 119. The carbon capture system may capture a $CO_2$ gas present in the methane-depleted exhaust gas. The $CO_2$ gas to be captured may include the $CO_2$ produced by the methane oxidation catalyst 116, converted from the methane. Thus, the methane may be indirectly captured by the carbon capture system due to the conversion of the methane to the $CO_2$ by the methane oxidation catalyst 116. Moreover, the burner 115 may combust remaining oxygen in the hot exhaust gas to reduce the amount of oxygen in the methane-depleted exhaust gas provided to the carbon capture system, thereby making carbon capture of the carbon capture system more efficient.

The methane-depleted exhaust gas may be mixed with colder water by a spray mixer 120, which may quench the methane-depleted exhaust gas down to about 100° F. Additionally, or alternatively, a gas-liquid separator 122 (e.g., a direct contact cooler (DCC)) may be used to quench and cool the methane-depleted exhaust gas. As a result, most of the water from combustion products in the exhaust condenses, and the condensed water is removed in the gas-liquid separator 122). The condensed water accumulates in a water storage tank 124 unless the condensed water is otherwise used or disposed of. After water separation, the condensed water may be cooled and recycled back to the spray mixer 120 and/or the gas-liquid separator 122 for cooling the methane-depleted exhaust gas. For example, the condensed water may be used as make-up water in a cooling tower, eliminating or reducing a problem of water disposal. Thus, the spray mixer 120 and/or the gas-liquid separator 122 may operate as a cooling system that is used to cool the methane-depleted exhaust gas into a cooled exhaust.

A portion of the cooled exhaust (e.g., cold exhaust), now depleted of most of the water and methane, may return to the intake buffer tank 110 via the SCC path 106, while a remaining portion of the cooled exhaust may be provided to a TSA screw/blower 126 (fan) via a TSA path 128. The SCC path 106 is part of an SCC exhaust loop that starts at the intake buffer tank 110, proceeds through the gas-liquid separator 122 to the exhaust return path 108, and returns back through the SCC path to the intake buffer tank 110. The SCC is used to increase $CO_2$ concentration for an adsorption bed (e.g., for capture vessels TS3, TS4, and TS5) via exhaust recirculation.

A flowrate at the TSA screw/blower 126, which may be a variable speed drive or may include other methods of flow regulation, indirectly sets a level of exhaust recirculation, since an engine flowrate is essentially fixed. Thus, $CO_2$ that is not removed by the greenhouse gas abatement system 100 may be recirculated, and a balance of the artificial atmosphere at the engine 112 may be made up by air and/or oxygen.

Downstream of the TSA screw/blower 126 is a network of interconnected components that are responsible for performing the carbon capture via a $CO_2$-TSA process. In some implementations, a different type of carbon capture system may be used, such as a solvent-based carbon capture system. Immediately downstream of the TSA screw/blower 126 is a heat exchanger/chiller 130, typically cooling the cold exhaust to 35-50° F., which will cause more water present in the cold exhaust to condense, reducing a load on molecular sieves that follow. A tank 131 may be connected immediately downstream from the heat exchanger/chiller 130 to separate the water from the cold exhaust.

Valves T1In, T2In, T1X, T2X, TID, T2D, TIC, T2C, TIH, T2H, T3In, T4In, T5In, T3D, T4D, T5D, T3X, T4X, T5X, T3T, T4T, T5T, T3C, T4C, T5C, T3H, T4H, T5H, and BPR are used to control a flow of one or more fluids throughout the greenhouse gas abatement system 100. An open state and a closed state of each of the valves may be controlled by a controller (not illustrated) according to one or more process stages of the $CO_2$-TSA process. For example, three capture vessels TS3, TS4, or TS5 may be arranged in parallel, and the valves may be controlled such that a process stage at each one of the three capture vessels TS3, TS4, or TS5 (e.g., $CO_2$ capture vessels) is controlled based on a batch sequence of the $CO_2$-TSA process. For example, the valves may be controlled such that the capture vessel TS3 is in an adsorption stage (e.g., a capture stage), while the capture vessel TS4 is in a cooling stage and the capture vessel TS5 is a regeneration stage. The valves may further be controlled such that the capture vessel TS4 is in an adsorption stage (e.g., a capture stage), while the capture vessel TS5 is in a cooling stage and the capture vessel TS3 is a regeneration stage. The valves may further be controlled such that the capture vessel TS5 is in an adsorption stage (e.g., a capture stage), while the capture vessel TS3 is in a cooling stage and the capture vessel TS4 is a regeneration stage. The batch sequence may then be repeated.

In some implementations, the capture vessels TS3, TS4, or TS5 may be referred to as "beds." Each capture vessel TS3, TS4, and TS5 may include media (e.g., capture media) that is configured to capture or adsorb $CO_2$. In some cases, the media may also adsorb water.

A first step in the $CO_2$-TSA process is a water dehydration process carried out by a blend of alumina and a 3 Angstrom (A) mole sieve in adsorbent vessels TSA1 and TSA2. The water dehydration process is a batch type process. Thus, when one adsorbent vessel TSA1 or TSA2 is adsorbing water, the other adsorbent vessel TSA1 or TSA2 is off-line, either being heated or being cooled. Valves T1In and T2In control which adsorbent vessel TSA1 or TSA2 is receiving the cold exhaust from the heat exchanger/chiller 130. For description purposes, assuming adsorbent vessel TSA1 is dehydrating, then valve T1In is open, and the cold exhaust flows through the adsorbent vessel TSA1 and out valve TID, through another cooler P2T, to one of the capture vessels TS3, TS4, or TS5 for carbon capture. At an adsorption inlet 132 of the capture vessels TS3, TS4, and TS5, the cold exhaust has essentially zero water, and is typically composed of 5-20% $CO_2$, 0-10% $O_2$, and a balance inert mixture (e.g., nitrogen, with a little argon).

Assuming the capture vessel TS3 is at this point adsorbing $CO_2$, valve T3In will be open, with valves T4In and T5In closed. The exhaust gas, now depleted of $CO_2$ via the capture vessel TS3 and water via one of the adsorbent vessels TSA1 and TSA2, flows out of the capture vessel TS3 via valve T3T, which is open, while valves T4T and T5T are closed. The exhaust gas flowing out of the capture vessel TS3 is a relatively warm dry gas having a temperature around 80-160° F., and is composed mostly of $N_2$ gas. The exhaust gas flowing out of the capture vessel TS3 flows out of the capture vessel TS3 and through the valve T3T and may be manifolded to several locations. For simplicity, this relatively warm dry gas that flows out of the capture vessel performing $CO_2$ adsorption (e.g., capture vessel TS3) may be referred to as a dry $N_2$ gas or depleted flue gas.

If all downstream valves are closed, or if a backpressure for some reason is too high, any excess dry $N_2$ gas will be discharged to atmosphere via a $CO_2$ TSA vent, controlled by a back pressure regulator of the valve BPR. Generally, the backpressure is lower than a setpoint of the back pressure regulator and the valve BPR remains closed.

A portion of the dry $N_2$ gas may be used to heat either adsorbent vessel TSA1 or TSA2 (e.g., whichever adsorbent vessel is not adsorbing water, in this example adsorbent vessel TSA2), or to cool TSA2, depending on a cycle time. During a heating process of one of the adsorbent vessels TSA1 or TSA2, the dry $N_2$ gas may be directed through an $N_2$ heater 134 (e.g., a heat exchanger) by opening one of the valves T1H or T2H and closing both valves TIC and T2C. During a cooling process of one of the adsorbent vessels TSA1 or TSA2, the dry (warm) $N_2$ gas may be directed from the valve T3T to bypass the $N_2$ heater 134 by opening one of the valves T1C or T2C and closing both valves T1H and T2H.

For example, if a design point is 8 hours for water adsorption (dehydration) in the adsorbent vessel TSA1 and the adsorbent vessel TSA2, then the adsorbent vessel TSA1 would be set for adsorbing water for 8 hours, and, in parallel, the adsorbent vessel TSA2 would be first set for regeneration (heated) by opening valves T2H and T2X, using the heated dry $N_2$ from the $N_2$ heater 134, for about 4 hours, and then would be cooled, for about 4 hours, by opening valve T2C, while closing valve T2H with valve T2X still open. After 8 hours this process would reverse, with TSA2 taking over the adsorption (dehydration) duty, and with TSA1 being heated, then cooled, via combinations of valve actions at T1H, TIC, and T1X. The cycle time for water adsorption is typically several hours, generally between 3 and 12 hours.

After chilling and condensation, there is in most cases an order of magnitude more $CO_2$ in the exhaust than water in the exhaust, and the capacity for $CO_2$ per unit weight of mole sieve is lower than that of water. As a result, cycle times for $CO_2$ adsorption in the capture vessels TS3, TS4, and TS5 are measured in minutes, not hours. Assuming the capture vessel TS3 is adsorbing $CO_2$ (e.g., valves T3In and T3T are open), a portion of the dry $N_2$ gas that exits the capture vessel TS3 via valve T3T, optionally further cooled via a heat exchanger/chiller 136, can pass through valve T4C to provide cooling to the capture vessel TS4, and can exit via valve T4X. It is noted that the volume of gas required for cooling may not be met fully by the flow rate coming from the capture vessel TS3, and methods to augment the flow via recirculation or mitigate the amount of flow needed are described below.

After the $CO_2$ adsorption cycle is complete (e.g., in capture vessel TS3), the captured $CO_2$ must be released during the regeneration stage. In a TSA process, releasing captured $CO_2$ is done mostly via heating. For example, when a mole sieve is cold and a partial pressure of a desired species is high, the mole sieve will adsorb the desired species. The mole sieve will release the desired species when a temperature is increased, and/or the partial pressure is lowered. Hence, the terms pressure swing, thermal swing, vacuum swing, or combinations of the swing processes are used to describe the capture and release of the desired species by the mole sieve.

In the present disclosure, that heating is provided by a hot gas mixture, which is mostly hot $CO_2$ in this example delivered via valve T3H to the capture vessel TS3. The hot $CO_2$ is generally at 600-800° F. The hot $CO_2$ gas flows downward from a $CO_2$-turbocharger 138, through valve T3H, and through the media in the capture vessel TS3, which gradually heats the media, and drives off more $CO_2$. Warm $CO_2$ exits the capture vessel TS3 and flows via valve T3D to a cooler 140 (e.g., a heat exchanger), and a portion of the $CO_2$ gas splits off, flowing through a separator 142 (in theory unneeded, this being dry gas, it is really there to add volume to improve control), to a $CO_2$ screw compressor 144, to a chiller 145 (e.g., a heat exchanger), a $CO_2$ storage tank 146, and downstream to the rest of the $CO_2$ compression or use systems. The flowrate at the $CO_2$ screw compressor 144, also generally variable speed, indirectly sets a pressure in the capture vessel TS3 during a desorption process of the regeneration stage.

A desorption flowrate required is much higher than a raw exhaust flowrate on both a mass and volume basis. In addition, given the higher temperature, a pressure drop through the capture vessel would also be higher, up to 10 psi, vs. 1-2 psi for adsorption, resulting in high electrical loads. In the present disclosure, the $CO_2$ gas produced during the desorption process is recirculated to support these higher flowrates, and more importantly, a powering for a recirculation of the $CO_2$ gas is performed by the $CO_2$-turbocharger 138.

Heat used to power the $CO_2$-turbocharger 138, and to heat a capture vessel TS3, TS4, or TS5 during the regeneration stage, comes from the exhaust of the engine 112. After passing through valve T3D and the cooler 140, a portion of the $CO_2$ gas released from the relevant capture vessel TS3, TS4, or TS5 (e.g., capture vessel TS3 in this example) enters a turbocharger compressor 148 of the $CO_2$-turbocharger 138 via manifold 149, boosted in pressure (e.g., to 15-25 psi), raising the temperature of the $CO_2$ gas to 300° F. or more. In other words, the manifold 149 connects capture vessel TS3, TS4, and TS5 to the turbocharger compressor 148 of the $CO_2$-turbocharger 138 to transport a $CO_2$ stream of $CO_2$ gas generated by a capture vessel set in the regeneration stage to the turbocharger compressor 148.

The heated $CO_2$ gas from the turbocharger compressor 148 then enters the exhaust heat exchanger 118 (e.g., $CO_2$ HX), and is heated to near raw exhaust temperature, typically 800-900° F. or higher, by a heat exchange process that uses the exhaust from the engine 112 (e.g., the heat from the methane-depleted exhaust gas provided by the methane oxidation catalyst 116) for further heating the heated $CO_2$ gas to produce hot $CO_2$ gas. This hot $CO_2$ gas is then expanded through an expander 150 (e.g., a decompressor) of the $CO_2$-turbocharger 138 (which causes the temperature of the hot $CO_2$ to drop due to less pressure). However, due to the super-heating process performed by the turbocharger compressor 148 and the exhaust heat exchanger 118, the $CO_2$ gas exiting the expander 150 still has a temperature equal to or greater than 600° F. that is sufficient for the regeneration process, and still at a pressure high enough to support a flow through the capture vessel TS3, TS4, or TS5 that is performing the regeneration (e.g., capture vessel TS3 in this example). For example, a pressure increase on a compressor side of the $CO_2$-turbocharger 138 significantly exceeds a pressure decrease on an expander side of the $CO_2$-turbocharger 138, such that a pressure of the $CO_2$ gas exiting the expander 150 toward the capture vessel TS3, TS4, or TS5 is high enough to support the flow of the $CO_2$ gas through the capture vessel TS3, TS4, or TS5 that is performing the regeneration. The expander 150 may be respectively coupled to the capture vessels TS3, TS4, TS5 via manifolds 152, 154, and 156 to provide a heated $CO_2$ gas to a capture vessel that is set in the regeneration stage. Thus, the heat of combustion produced by the burner 115, which is still substantially present in the methane-depleted exhaust gas, may be used for regeneration of the capture media after an adsorption stage (e.g., after adsorption of a portion of the $CO_2$ gas present in the exhaust stream). The heat of combustion produced by the burner 115 may be used, via the exhaust heat exchanger 118 and the $CO_2$-turbocharger 138, to improve the regeneration of the capture media by reducing an amount of time for regeneration and/or increasing a percentage of carbon captured by the capture media due to increased regeneration. At an end of the regeneration process, virtually no $CO_2$, and almost no water, remains in the capture vessel TS3, TS4, or TS5 that is performing the regeneration (e.g., the capture vessel TS3).

As a result of the regeneration process, the media (e.g., the mole sieve) of the capture vessel TS3, TS4, or TS5 is hot, typically with an average temperature of about 500° F., and must be cooled to prepare the capture vessel for a next $CO_2$ adsorption cycle. A cooling process for the capture vessel TS3 is accomplished by opening valves T3C and T3X, while closing valves T3In, T3T, T3H, and T3D. In other words, the dry (warm) $N_2$ gas that exits the capture vessel set in the adsorbing stage (e.g., capture vessel TS5 for cooling of capture vessel TS3) is directed into the capture vessel TS3 for cooling the media of the capture vessel TS3.

The cooling process need not return the media temperature fully to ambient temperature. Any temperature under 100° C. (212° F.) will provide some capacity for initial adsorption of $CO_2$, with temperatures near or below 50° C. (122° F.) being preferred. The cooling process may continue in parallel with the adsorption process to some extent since a raw exhaust stream from cooler P2T (e.g., a heat exchanger) is provided at nominally 10° C. (50° F.).

While the burner 115 at least partially mitigates an exhaust $CH_4$ slip, the burner discharge temperature may be used for increased $CH_4$ oxidation catalyst performance, achieving increased $CH_4$ conversion at temperatures greater than 900° F. Downstream of the burner 115, the methane oxidation catalyst 116 could be utilized as described above. A higher temperature exhaust gas provided by burner 115 to the methane oxidation catalyst 116 may improve the methane conversion from 70-80% to over 90%. The burner 115 may also reduce the impacts of sulfur on deactivation of the methane oxidation catalyst 116. Thus, the burner 115 could be used to avoid the sulfur treatment unit upstream of the engine 112. Furthermore, the elevated temperature provided by the burner 115 may consume 99.5% of carbon monoxide (CO). Removing the carbon monoxide, a contaminant, from the exhaust stream may lead to a reduction in a number of stages within the greenhouse gas abatement system 100, which may reduce an overall cost of the greenhouse gas abatement system 100.

Figure 2:
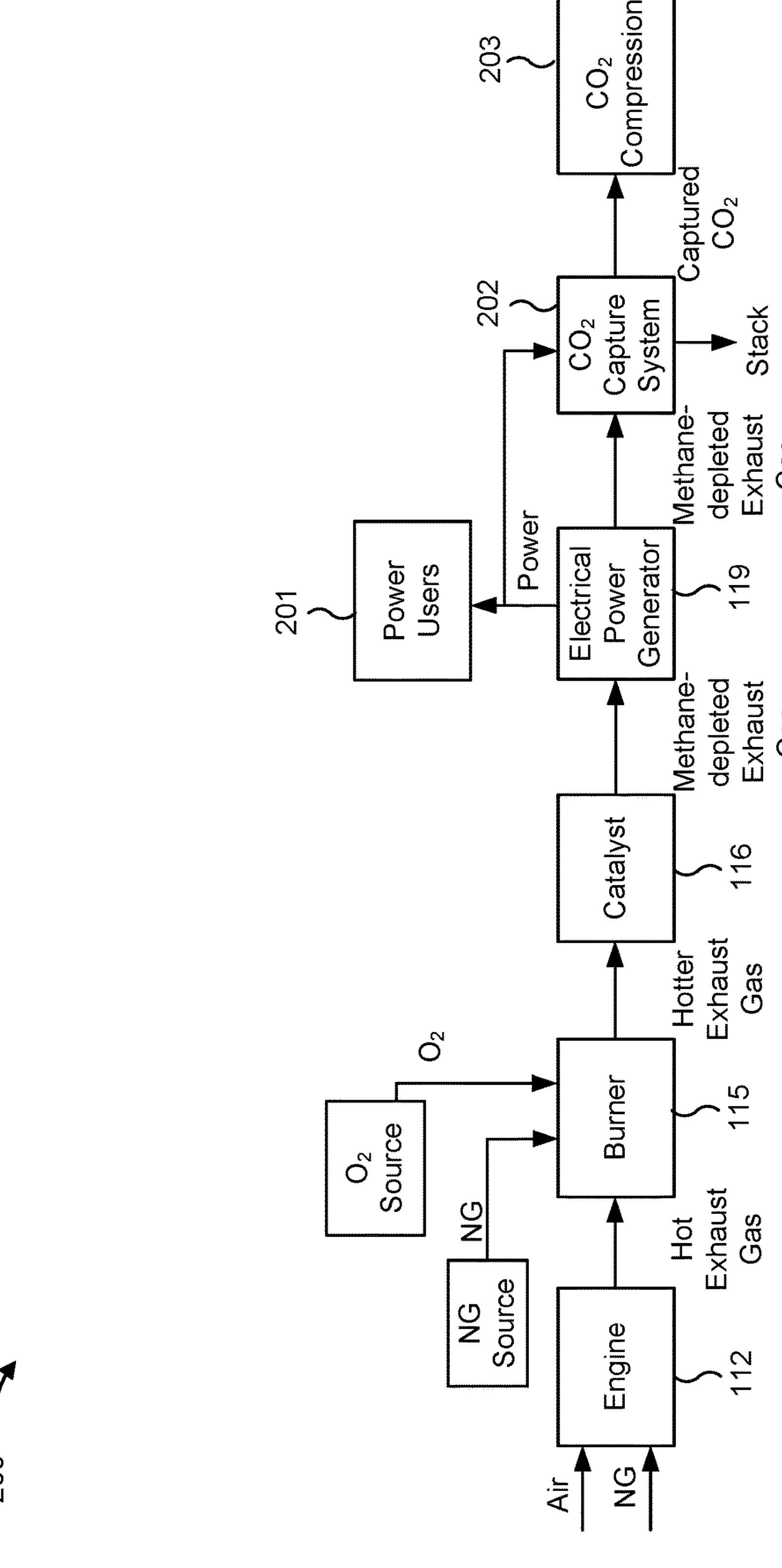
FIG. 2 illustrates a methane mitigation system according to one or more implementations.

FIG. 2 illustrates a methane mitigation system 200 according to one or more implementations. The methane mitigation system 200 may include the engine 112, the burner 115, the methane oxidation catalyst 116, and the electrical power generator 119 arranged in series along a gas flow path. The methane mitigation system 200 may also include one or more power users 201, a carbon capture system 202, and a $CO_2$ compression system 203.

The burner 115 may provide at least one of the following benefits, including (1) provides the methane oxidation catalyst 116 with additional heat (e.g., the combustion generates heat) in order to destroy methane and carbon monoxide present in the hot exhaust gas, (2) provides the methane oxidation catalyst 116 with additional heat in order to prevent sulfur poisoning, (3) provides the carbon capture system 202 with additional heat for regenerative purposes within a carbon capture process of the carbon capture system 202, and (4) provides the electrical power generator 119 with additional heat to increase an amount of power generated by the electrical power generator 119 and an efficiency at which the power is generated by the electrical power generator 119. The burner 115 adds the additional heat (e.g., the heat of combustion) to the waste heat produced by the engine 112 in order to increase efficiencies of the methane and carbon monoxide conversion to $CO_2$ and to increase efficiencies of the carbon capture system 202.

Additionally, the electrical power generated by the electrical power generator 119 may be provided to one or more power users 201 (e.g., electrical loads), which may be any electrical component or electrical system. Additionally, or alternatively, the electrical power generated by the electrical power generator 119 may be provided to the carbon capture system 202. Thus, when coupled to the carbon capture system 202, the electrical loads of the carbon capture system 202 may be offset by the electrical power generated by the electrical power generator 119. In other words, the methane mitigation system 200 may be used to provide a net-zero-power or a net-positive-power carbon capture process. Thus, the methane mitigation system 200 may be a net-zero-power or a net-positive-power electrical power system.

The carbon capture system 202 is arranged downstream from the electrical power generator 119, and is configured to capture a $CO_2$ gas present in the methane-depleted exhaust gas. The $CO_2$ gas includes the $CO_2$ produced by the methane oxidation catalyst 116, converted from the methane. The burner 115 may combust oxygen (e.g., excess oxygen) in the hot exhaust gas to reduce an amount of oxygen in the methane-depleted exhaust gas provided to the carbon capture system 202. In some implementations, the exhaust heat exchanger 118 may be arranged between the burner 115 and the carbon capture system 202, and may be thermally coupled to the carbon capture system 202. The carbon capture system 202 may be a solvent-based absorption system (e.g., an amine absorption system) or a molecular sieve adsorption system. Thus, the carbon capture system 202 includes carbon capture media configured to adsorb (molecular sieve) or absorb (solvent) at least a portion of the $CO_2$ gas present in the methane-depleted exhaust gas. The carbon capture system 202 may send $CO_2$-depleted gas to an emissions stack (e.g., for release into the atmosphere) and may provide captured $CO_2$ gas to the $CO_2$ compression system 203.

Figure 3:
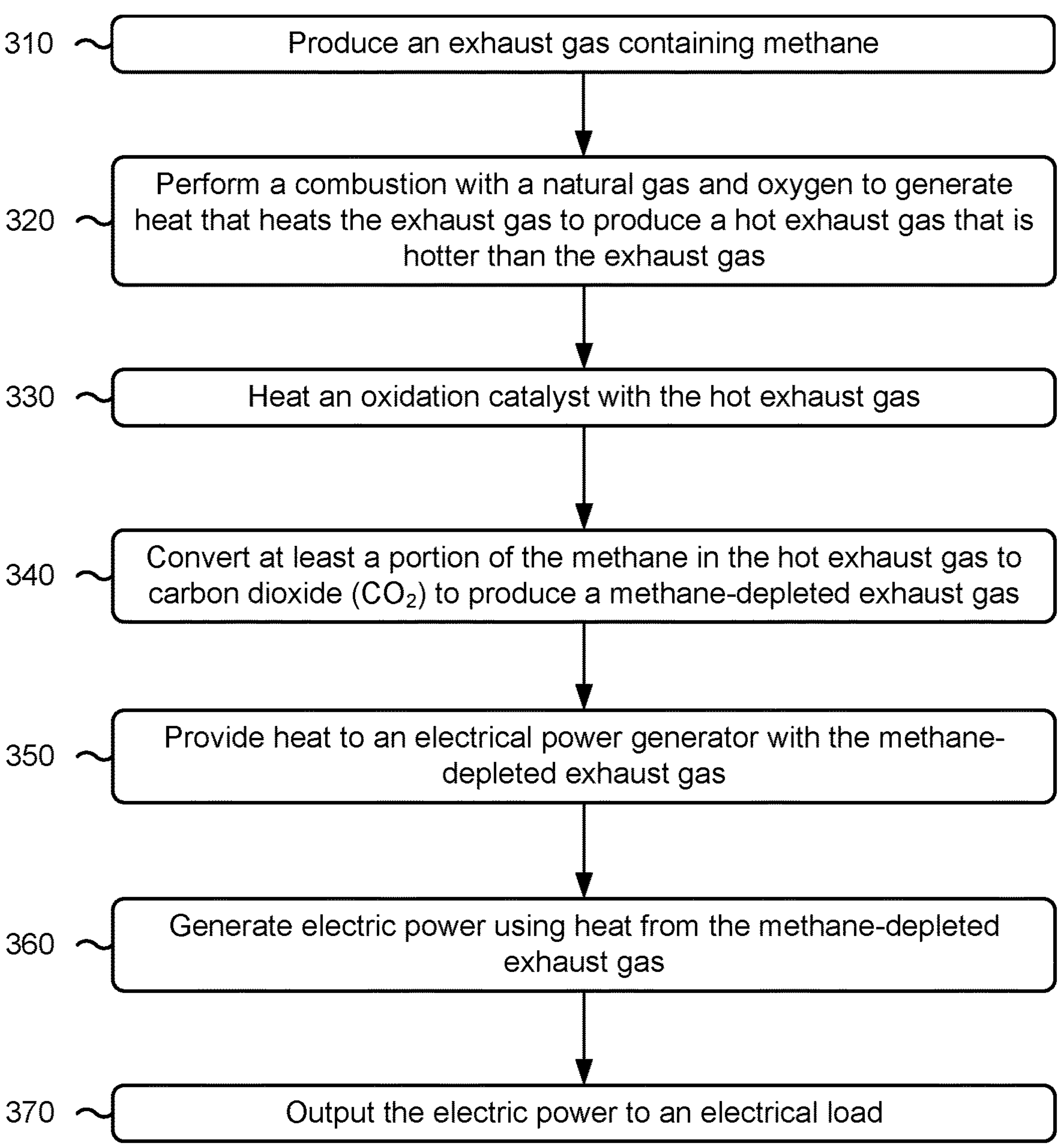
FIG. 3 is a flowchart of an example process associated with methane mitigation system with use of a waste heat for power generation.

FIG. 3 is a flowchart of an example process 300 associated with methane mitigation system with use of a waste heat for power generation. In some implementations, one or more process blocks of FIG. 3 are performed by a methane mitigation system (e.g., methane mitigation system 200). Additionally, or alternatively, one or more process blocks of FIG. 3 may be performed by one or more components of the methane mitigation system 200, such as the engine 112, the burner 115, the methane oxidation catalyst 116, and/or the electrical power generator 119. One or more controllers and/or processors may be used to control a method of methane mitigation and/or carbon capture.

As shown in FIG. 3, process 300 may include producing an exhaust gas containing methane (block 310). For example, the engine 112 may be an exhaust source that may produce an exhaust gas containing methane, as described above.

As further shown in FIG. 3, process 300 may include performing a combustion with a natural gas and oxygen to generate heat that heats the exhaust gas to produce a hot exhaust gas that is hotter than the exhaust gas (block 320). For example, the burner 115 may perform a combustion with a natural gas and oxygen to generate heat that heats the exhaust gas to produce a hot exhaust gas that is hotter than the exhaust gas, as described above.

As further shown in FIG. 3, process 300 may include heating an oxidation catalyst, arranged downstream from the burner, with the hot exhaust gas (block 330). For example, the burner 115 may heat an oxidation catalyst, arranged downstream from the burner 115, with the hot exhaust gas, as described above.

As further shown in FIG. 3, process 300 may include converting at least a portion of the methane in the hot exhaust gas to $CO_2$ to produce a methane-depleted exhaust gas (block 340). The heating of the oxidation catalyst may increase an amount of methane converted by the oxidation catalyst into the $CO_2$. For example, the methane oxidation catalyst 116 may convert at least a portion of the methane in the hot exhaust gas to $CO_2$ to produce a methane-depleted exhaust gas, as described above.

As further shown in FIG. 3, process 300 may include providing heat to an electrical power generator, arranged downstream from the oxidation catalyst, with the methane-depleted exhaust gas (block 350). For example, the methane oxidation catalyst 116, in combination with the burner 115, may provide heat to the electrical power generator 119, arranged downstream from the methane oxidation catalyst 116, with the methane-depleted exhaust gas, as described above.

As further shown in FIG. 3, process 300 may include generating electric power using heat from the methane-depleted exhaust gas (block 360). The heating of the electrical power generator with the methane-depleted exhaust gas may increases a temperature of the electrical power generator to a target temperature range in order to increase a power generation efficiency of the electrical power generator. For example, the electrical power generator 119 may generate electric power using heat from the methane-depleted exhaust gas, as described above.

As further shown in FIG. 3, process 300 may include outputting the electric power to an electrical load (block 370). For example, the electrical power generator 119 may output the electric power to an electrical load, as described above.

Process 300 may include additional implementations, such as any single implementation or any combination of implementations described below and/or in connection with one or more other processes described elsewhere herein.

In an implementation, process 300 includes providing the methane-depleted exhaust gas to a carbon capture system to capture $CO_2$ from the methane-depleted exhaust gas.

Although FIG. 3 shows example blocks of process 300, in some implementations, process 300 includes additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The described implementations significantly reduce greenhouse gas emissions into the atmosphere. The described implementations provide an integrated and efficient $CO_2$ capture system for engine exhaust and address $CH_4$ slips from an engine, a piston, or a gas turbine. The described systems include several key components and processes designed to achieve optimal performance in terms of $CH_4$ abatement and $CO_2$ capture efficiency, lower costs of carbon capture in small distributed applications, use of waste heats to reduce the electrical loads, and reduce an amount of $CH_4$ in an exhaust stream.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Temperature relative terms, such as "warm," "hot," "hotter," "cold," "colder," "cool," "cooler," and the like, may be used herein for ease of description to describe one element's or feature's relationship to another element(s) or feature(s) and are meant to be relative to each other and not restricted to any specific range of absolute temperature unless specifically defined. Even if specifically defined, absolute temperatures or temperature ranges are intended to serve as examples.

Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A methane mitigation system, comprising:

an exhaust source configured to produce an exhaust gas including methane;

a burner arranged downstream from the exhaust source and configured to receive the exhaust gas and a natural gas, wherein the burner is configured to use the natural gas for combustion to produce a heat of combustion that is configured to heat the exhaust gas to produce a hot exhaust gas;

an oxidation catalyst arranged downstream from the burner and configured to receive the hot exhaust gas and convert at least a portion of the methane in the hot exhaust gas to carbon dioxide ($CO_2$), wherein the oxidation catalyst is configured to be heated by the hot exhaust gas, and wherein the oxidation catalyst is configured to output a methane-depleted exhaust gas; and an electrical power generator arranged downstream from the oxidation catalyst and configured to receive the methane-depleted exhaust gas, wherein the electrical power generator is configured to convert a portion of a remaining heat from the methane-depleted exhaust gas into electrical power, and wherein the electrical power generator is configured to output the electrical power to an electrical load.

2. The methane mitigation system of claim 1, wherein the exhaust gas includes oxygen, and wherein the burner is configured to use the oxygen for the combustion in the burner.

3. The methane mitigation system of claim 1, wherein the burner is configured to receive oxygen from an external oxygen source, and wherein the burner is configured to use the oxygen for the combustion.

4. The methane mitigation system of claim 1, wherein the hot exhaust gas is configured to increase a temperature of the oxidation catalyst in order to increase an amount of methane converted by the oxidation catalyst into the $CO_2$.

5. The methane mitigation system of claim 1, wherein the hot exhaust gas is configured to increase a temperature of the oxidation catalyst in order to increase a tolerance of the oxidation catalyst to sulfur components present in the hot exhaust gas.

6. The methane mitigation system of claim 1, wherein the oxidation catalyst is made of at least one platinum-group metal.

7. The methane mitigation system of claim 1, wherein the electrical power generator is an Organic Rankine Cycle (ORC) power generator.

8. The methane mitigation system of claim 1, wherein the methane-depleted exhaust gas increases a maximum temperature of the electrical power generator in order to increase a power generation efficiency of the electrical power generator.

9. The methane mitigation system of claim 1, wherein the burner is configured to heat the oxidation catalyst with the hot exhaust gas to an operating temperature that is between 900° F. and 1400° F.

10. The methane mitigation system of claim 1, wherein the burner is configured to receive the natural gas from an external natural gas source that is separate from the exhaust source.

11. The methane mitigation system of claim 1, wherein the methane mitigation system is a net-zero-power or a net-positive-power electrical power system.

12. The methane mitigation system of claim 1, further comprising:

a carbon capture system arranged downstream from the electrical power generator, wherein the carbon capture system is configured to capture a $CO_2$ gas present in the methane-depleted exhaust gas.

13. The methane mitigation system of claim 12, wherein the $CO_2$ gas includes the $CO_2$ produced by the oxidation catalyst, converted from the methane.

14. The methane mitigation system of claim 12, wherein the burner is configured to combust oxygen in the exhaust gas to reduce an amount of oxygen in the methane-depleted exhaust gas provided to the carbon capture system.

15. The methane mitigation system of claim 12, wherein the electrical power generator is configured to provide the electrical power to the carbon capture system.

16. The methane mitigation system of claim 12, wherein the electrical power generator is configured to reduce an electrical load of the carbon capture system.

17. The methane mitigation system of claim 1, further comprising:

a carbon capture system arranged downstream from the electrical power generator, wherein the carbon capture system includes carbon capture media configured to adsorb or absorb at least a portion of a $CO_2$ gas present in the methane-depleted exhaust gas, and wherein the carbon capture system is configured to use a portion of the heat from the hot exhaust gas for regenerative purposes within a carbon capture process.

18. The carbon capture system of claim 17, wherein the regenerative purposes apply to at least one of a molecular sieve or a solvent of the carbon capture system.

19. A method of mitigating methane, the method comprising:

producing, by an exhaust source, an exhaust gas containing methane;

performing, by a burner arranged downstream from the exhaust source, a combustion with a natural gas and oxygen to generate heat that heats the exhaust gas to produce a hot exhaust gas that is hotter than the exhaust gas;

heating an oxidation catalyst, arranged downstream from the burner, with the hot exhaust gas;

converting, by the oxidation catalyst, at least a portion of the methane in the hot exhaust gas to carbon dioxide ($CO_2$) to produce a methane-depleted exhaust gas, wherein heating the oxidation catalyst increases an amount of methane converted by the oxidation catalyst into the $CO_2$;

providing heat to an electrical power generator, arranged downstream from the oxidation catalyst, with the methane-depleted exhaust gas;

generating, by the electrical power generator, electric power using heat from the methane-depleted exhaust gas, wherein heating the electrical power generator with the methane-depleted exhaust gas increases a temperature of the electrical power generator to a target temperature range in order to increase a power generation efficiency of the electrical power generator; and outputting, by the electrical power generator, the electric power to an electrical load.

20. The method of claim 19, further comprising:

providing the methane-depleted exhaust gas to a carbon capture system to capture $CO_2$ from the methane-depleted exhaust gas.

* * * * *